US006563071B2

(12) United States Patent
Krenz

(10) Patent No.: US 6,563,071 B2
(45) Date of Patent: May 13, 2003

(54) METHOD AND APPARATUS FOR ELECTRICAL DISCHARGE MACHINING WITH MULTIPLE WORKSTATIONS

(75) Inventor: Rudi Oskar Krenz, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 09/855,443

(22) Filed: May 15, 2001

(65) Prior Publication Data

US 2002/0170885 A1 Nov. 21, 2002

(51) Int. Cl.[7] .................................................. B23H 1/02
(52) U.S. Cl. ................................. 219/69.13; 219/69.17; 219/69.2; 307/18
(58) Field of Search ........................... 219/69.17, 69.13, 219/69.18, 69.2; 307/18

(56) References Cited

U.S. PATENT DOCUMENTS 3,391,268 A * 7/1968 Libby et al.
3,519,785 A * 7/1970 Vetter
4,320,278 A * 3/1982 Bell, Jr. et al. .......... 219/69.13
5,917,250 A * 6/1999 Kakalec et al. ................ 307/18
6,353,199 B1 * 3/2002 Hosaka et al. ............. 219/69.2

FOREIGN PATENT DOCUMENTS

| GB | 2248032 A | * | 3/1992 | |
| JP | 1-216726 A | * | 8/1989 | 219/69.13 |
| JP | 6-226538 A | * | 8/1994 | 219/69.13 |
| JP | 8-309620 A | * | 11/1996 | |

OTHER PUBLICATIONS

U.S. patent application No. 09/401,524, filed Sep. 22, 1999.
U.S. patent application No. 09/666,852, filed Sep. 20, 2000.

* cited by examiner

Primary Examiner—Geoffrey S. Evans
(74) Attorney, Agent, or Firm—V. G. Ramaswamy; Pierce Atwood

(57) ABSTRACT

An electrical discharge machining (EDM) apparatus includes a plurality of work stations, where each work station has at least one electrode. The EDM apparatus further includes one or more power supplies and a power transfer switch for alternately supplying power to various sets of the electrodes. The power transfer switch has a first state wherein each power supply is connected to a corresponding first electrode in one of the work stations and a second state wherein each power supply is connected to a corresponding second electrode in another work station.

28 Claims, 3 Drawing Sheets

METHOD AND APPARATUS FOR ELECTRICAL DISCHARGE MACHINING WITH MULTIPLE WORKSTATIONS

BACKGROUND OF THE INVENTION

This invention relates generally to electrical discharge machining and more particularly to electrical discharge machining workpieces, such as aircraft engine parts, which have several features machined therein.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece.

A problem with this type of apparatus is that is whenever one station gets hung up (i.e., fails to discharge for some reason such as electrode misalignment or a EDM particle remaining in the electrode-workpiece gap) all of the stations will become hung up. And since all stations are stopped, it is not evident which station is causing the stoppage. Furthermore, each station must use the same electrode material and polarity because of the series power connection. Thus, each station machines the same feature into the parts. Parts requiring additional features must then be moved to another machine. This means that multiple machines, fixtures and part handling are required before a part is completed. Another inefficiency with these conventional EDM apparatuses is that the dielectric tank must be drained and refilled between each cycle to load and unload the parts because the workpiece fixtures are all located and submerged in the tank.

Accordingly, there is a need for an EDM apparatus that more efficiently machines workpieces having multiple features to be machined therein.

BRIEF SUMMARY OF THE INVENTION

The above-mentioned need is met by the present invention, which provides an electrical discharge machining apparatus having a plurality of work stations, where each work station includes at least one electrode. The apparatus further includes one or more power supplies and a power transfer switch for alternately supplying power to various sets of the electrodes. The power transfer switch has a first state wherein each power supply is connected to a corresponding first electrode in one of the work stations and a second state wherein each power supply is connected to a corresponding second electrode in another work station.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
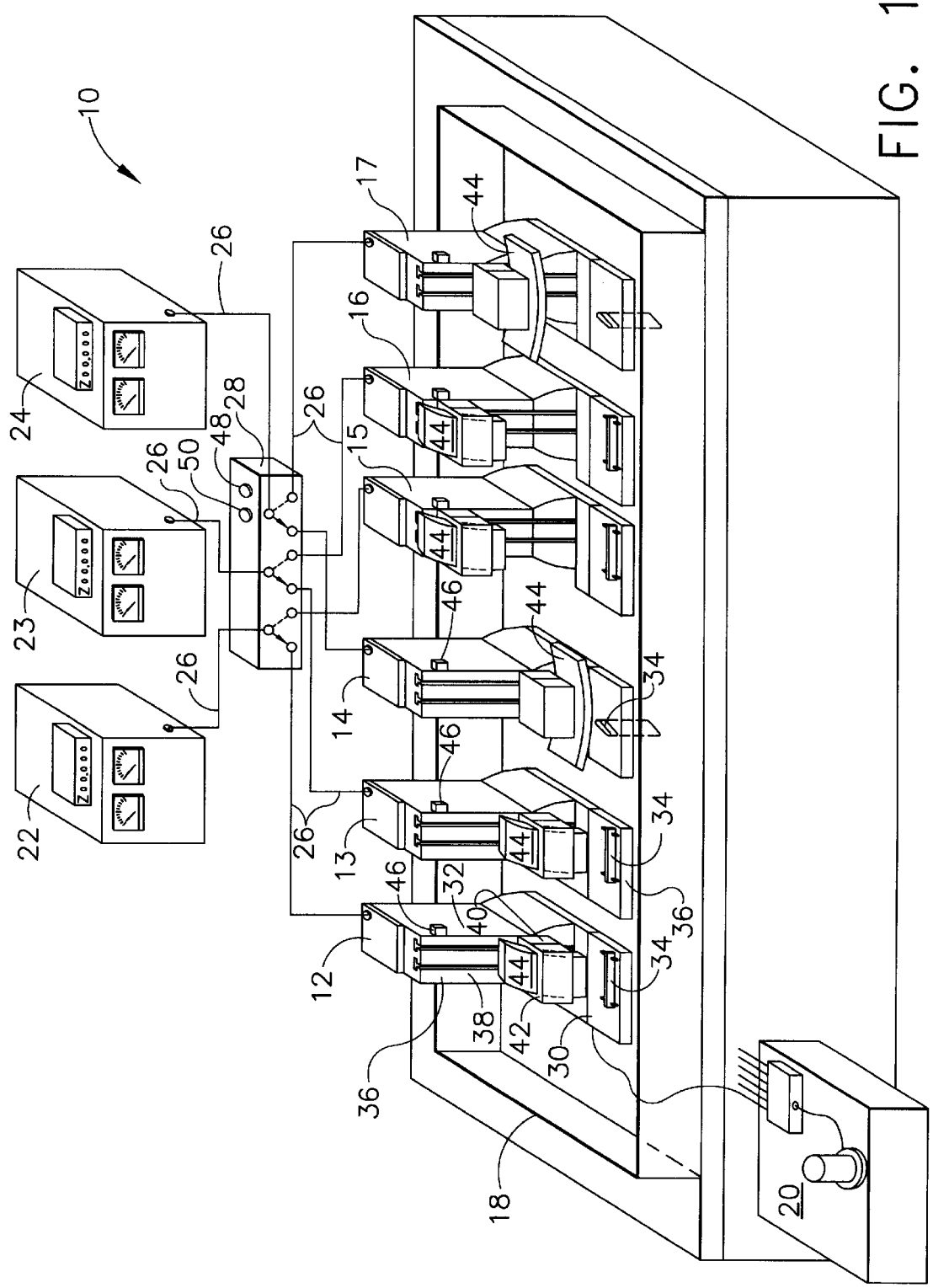
FIG. 1 is a schematic view of a first embodiment of an EDM apparatus.

Referring to the drawings wherein identical reference numerals denote the same elements throughout the various views, FIG. 1 shows an electrical discharge machining (EDM) apparatus 10. The EDM apparatus 10 includes six individual work stations 12–17 disposed in a tank 18. Although six work stations are shown in FIG. 1 for purposes of illustration, it should be noted that virtually any number of such stations could be employed in the EDM apparatus 10 of the present invention. Each work station 12–17 operates independently to machine a separate workpiece. As is well known in the field, the tank 18 is filled with a suitable dielectric fluid, such as a dielectric oil, so that each workpiece is immersed in the fluid. The dielectric fluid insulates against premature spark discharge, cools the machined area, and flushes away machining debris. A filtering system 20 is connected to the tank 18 for filtering the dielectric fluid, preferably down to one micron absolute.

The apparatus 10 also includes three standard EDM control systems 22–24. As is known in the field, each EDM control system 22–24 includes a power supply or spark generator and a controller, such as a computer numerical control (CNC). The power supply of each EDM control system 22–24 provides energy to a selected one of the work stations via power cables 26 and a power transfer switch 28. In particular, the power supply of each EDM control system 22–24 is connected to the power transfer switch 28. When the power transfer switch 28 is in a first state, power from the first EDM control system 22 is delivered to the first work station 12, power from the second EDM control system 23 is delivered to the second work station 13, and power from the third EDM control system 24 is delivered to the third work station 14. When the power transfer switch 28 is in a second state, power from the first EDM control system 22 is delivered to the fourth work station 15, power from the second EDM control system 23 is delivered to the fifth work station 16, and power from the third EDM control system 24 is delivered to the sixth work station 17. Thus, the work stations 12–14 operate together as a first group, and the work stations 15–17 operate together as a second group. Operation of the two groups will alternate depending on the state of the power transfer switch 28.

The controllers are connected to corresponding work stations via servo cables (not shown) to control workpiece positioning while a particular work station is operating. Specifically, the first EDM control system 22 is connected to the first and fourth work stations 12 and 15, the second EDM control system 23 is connected to the second and fifth work stations 13 and 16, and the third EDM control system 24 is connected to the third and sixth work stations 14 and 17.

Each work station 12–17 has a two-part base structure comprising a lower base 30 and an upper base 32 that is supported above the lower base 30. An electrode 34 is disposed in the upper surface of each lower base 30. The electrodes 34 can be any type of electrode used in electrical discharge machining. Electrical energy is selectively delivered to the electrodes 34 through the electrically conductive lower bases 30, which are electrically connected to the respective power cables 26. Each electrode shares a power supply with one other one of the electrodes. Accordingly, there are twice as many electrodes as power supplies.

A linear servomotor 36 is mounted on the upper base 32 of each work station. It should be noted that while linear servomotors are shown in FIG. 1 to facilitate disclosure of the present invention, rotary servomotors could alternatively be used. However, linear motors are generally preferred because of their better speed, faster frequency response and positional accuracy. The servomotor 36 comprises a linear motor stator 38, which is fixedly attached to the upper base 32, and a linear motor slider 40, which is slidingly mounted on the stator 38. The linear servomotor 36 operates in a conventional manner in that when the motor is energized, the slider 40 is caused to move linearly with respect to the stator 38. In this case, the servomotor 36 is arranged vertically on the upper base 32 so that the slider 40 will move vertically, toward or away from the electrode 34. The displacement of the slider 40 is dictated by signals sent from the CNC in the corresponding EDM control system 22–24 that is coupled to the respective servomotors 36.

A workpiece fixture 42 is affixed to each slider 40 for movement therewith. Each fixture 42 holds a workpiece 44 in position for machining. That is, as each slider 40 is moved toward or away from the corresponding electrode 34, its workpiece 44 is moved into or out of machining engagement with the electrode 34. The example workpieces 44 shown in FIG. 1 are shrouds for use in an aircraft engine. A typical aircraft engine employs a plurality of such shrouds arranged in an annular array around the engine's turbine rotor. The shrouds thus define an outer boundary for hot combustion gases flowing through the turbine. Shrouds are ordinarily made by a process in which a casting of the shroud is made, and various features are then machined into the casting. For example, the shrouds 44 of FIG. 1 have an anti-rotation notch machined into one side thereof and a seal slot machined into each end thereof. Each group of work stations is thus able to machine all of the features. That is, the first and fourth work stations 12 and 15 machine one seal slot, the second and fifth work stations 13 and 16 machine the opposite seal slot, and the third and sixth work stations 14 and 17 machine the anti-rotation notch. It should be noted that a shroud is only an illustrative example of one workpiece that is suitable for use with the EDM apparatus 10. The present invention is not limited to such workpieces and is applicable to virtually any workpiece in which multiple features are machined.

Each work station further includes a retract sensor 46 for detecting when the slider 40, and hence the fixture 42 and workpiece 44, are in the retracted position away from the electrode 34. The retract sensors 46 can be any conventional device such as a mechanical limit switch or a proximity sensor disposed on the upper base 32 or stator 38 in an appropriate location so as to be triggered when the workpiece 44 is retracted. When triggered, the retract sensors 46 output a signal to the power transfer switch 28. Electrical energy is delivered to the workpieces 44 through the electrically conductive fixtures 42, which are electrically connected to the respective power cables 26.

A linear measuring scale (not shown) is mounted adjacent to each servomotor 36. The linear measuring scale is a conventional device that precisely measures the position and velocity of the slider 40 and provides feedback of these measurements to the servocontrols in the EDM control systems 22–24.

The power transfer switch 28 comprises a multiplexer or a series of relay switches and utilizes standard control circuitry having an AND gate to cause switching between the first and second states in response to input from the various retract switches 46. The power transfer switch 28 includes an acknowledge button 48 connected to the control circuitry. The control circuitry includes means such that the power transfer switch 28 will not be able to switch between its first and second states unless the acknowledge button 48 has been pressed. That is, the acknowledge button 48 overrides the means for preventing switch over. The acknowledge button 48 resets whenever the power transfer switch 28 switches between its first and second states. A stop button 50 is provided for emergency cut-off of power to all of the work stations 12–17.

In operation, the first group of work stations 12–14 alternate with the second group of work stations 15–17. While one group of work stations is operating, the other group is retracted and available for workpiece loading. For example, FIG. 1 shows work stations 12–14 in operation while work stations 15–17 are in their retracted positions. The linear servomotors 36 of work stations 12–14 advance their workpieces 44 toward the corresponding electrodes 34 under the control of the EDM control systems 22–24. The electrodes 34 are energized by the power supply in the corresponding EDM control systems 22–24 for providing electrical energy to produce electrical discharges or sparks between the electrodes 34 and the workpieces 44 when the workpieces 44 are positioned adjacent to the corresponding electrodes 34. As the sparks vaporize the workpiece material, the servomotors 36 continue to advance the workpieces 44 as dictated by the EDM control systems 22–24 until the desired feature is finished.

While the first group of work stations 12–14 is operating, an operator loads new workpieces 44 into the retracted workpiece fixtures 42 of the second group of work stations 15–17. The operator presses the acknowledge button 48 when all of the new workpieces 44 are properly loaded. When the machining operation is completed for each work station 12–14, the servomotors 36 retract the workpiece fixtures 42 and workpieces 44 out of the dielectric fluid, causing the retract sensors 46 to be tripped. When all three of the retract sensors 46 for the first group of work stations 12–14 have been tripped, the power transfer switch 28 switches states (provided that the acknowledge button 48 has been pressed since the last switch over). This removes all power from the first group of work stations 12–14 and activates the second group of work stations 15–17 so that the newly loaded work pieces 44 are machined. This alternating work cycle repeats continuously.

With this arrangement, the multiple work stations of each group operate independently because each station has its own EDM control system 22–24 while it is operating, which includes a power supply and a servocontrol. Thus, the work stations within each group can perform different operations; that is, each station can work on a different type of part and/or machine a different feature. More specifically, each work station can have a different type of electrode 34 (e.g., one station can have a graphite electrode, while other stations may use brass, copper or copper tungsten electrodes) and use different electrode polarities. In addition, while FIG. 1 shows the same type of workpiece 44 in each of the six work stations 12–17, it is possible to have the first and second groups machining different types of workpieces. In this case, the power transfer switch 28 could switch to different burn parameters as the power is being switched.

Furthermore, because the workpieces 44 are supported above the electrodes 34 by the retractable workpiece fixtures 42, they can be removed without the need of draining the dielectric fluid from the tank 14. This is particularly advantageous when the work stations are performing different machining operations because if one station finishes before another, then the completed part can be removed and a new workpiece loaded while the other stations are still operating. Positioning the workpieces 44 above the electrodes 34 also aids removal of machining debris. Since the workpiece is moved above the electrode, debris is vibrated loose and exits the work area to the bottom under the force of gravity. This reduces the likelihood that one of the stations will get hung up. But if such a problem does occur, only the affected work station will be stopped. Unlike a conventional EDM apparatus, the other work stations will continue to operate because they have independent power supplies. This not only lessens the impact of a shut down on the total production rate, but also makes it readily apparent which station is encountering the problem, thus greatly facilitating trouble shooting.

Figure 2:
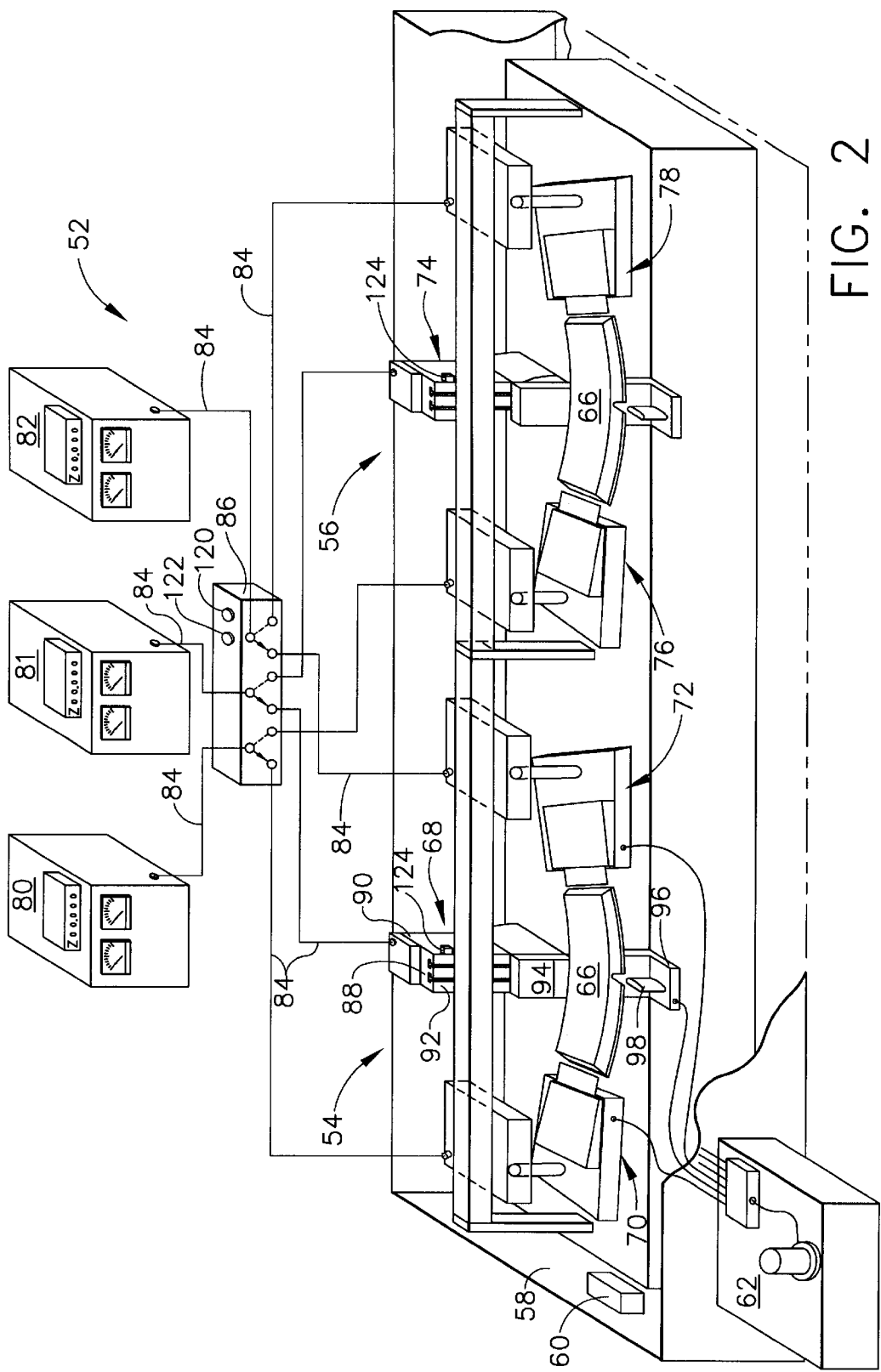
FIG. 2 is a schematic view of a second embodiment of an EDM apparatus.

Turning now to FIG. 2, an EDM apparatus 52 of a second embodiment is shown. The EDM apparatus 52 includes two work stations 54, 56 disposed in a tank 58, which is shown in partial cut-away to reveal the work stations 54, 56 therein. Although two work stations are shown in FIG. 2 for purposes of illustration, it should be noted that additional such stations, operating independently, could be disposed in the tank 58. As with the first described embodiment, the tank 58 is filled with a suitable dielectric fluid, such as a dielectric oil, for insulating against premature spark discharge, cooling the machined area, and flushing away machining debris. A float switch 60 is provided in the tank 58 for detecting when the dielectric fluid reaches a sufficient depth. The float switch 60 is located such that the level of dielectric fluid is just high enough to immerse workpieces installed in the work stations 54, 56. A filtering system 62 is connected to the tank 58 for filtering the dielectric fluid, preferably down to one micron absolute.

Each work station 54, 56 includes a workpiece fixture 64 (shown in FIG. 3) supported in the tank 58 for holding a workpiece 66. As with the first embodiment, the example workpieces 66 shown in FIG. 2 are shrouds for use in an aircraft engine. However, a shroud is only an illustrative example of one workpiece that is suitable for use with the EDM apparatus 52. This embodiment is not limited to such workpieces and is applicable to virtually any workpiece in which multiple features are machined.

The first work station 54 includes first, second and third machining heads 68, 70 and 72, wherein each machining head machines a different feature into the workpiece 66. The first machining head 68 is mounted above the workpiece 66 for machining the anti-rotation slot. The second machining head 70 is mounted adjacent one end of the workpiece 66 for machining the first seal slot, and the third machining head 72 is mounted adjacent the other end of the workpiece 66 for machining the second seal slot. Similarly, the second work station 56 includes fourth, fifth, and sixth machining heads 74, 76 and 78. The fourth machining head 74 is mounted above the workpiece 66 of the second work station 56 for machining the anti-rotation slot. The fifth machining head 76 is mounted adjacent one end of the workpiece 66 for machining the first seal slot, and the sixth machining head 78 is mounted adjacent the other end of the workpiece 66 for machining the second seal slot.

The apparatus 52 also includes three standard EDM control systems 80–82. Each EDM control system 80–82 includes a power supply or spark generator and a controller, such as a computer numerical control (CNC). The power supply of each EDM control system 80–82 provides energy to a selected one of the work stations via power cables 84 and a power transfer switch 86. In particular, the power supply of each EDM control system 80–82 is connected to the power transfer switch 86 so that power can be alternated between the first and second work stations 54, 56. That is, when the power transfer switch 86 is in a first state, power from the first EDM control system 80 is delivered to the second machining head 70, power from the second EDM control system 81 is delivered to the first machining head 68, and power from the third EDM control system 82 is delivered to the third machining head 72. When the power transfer switch 86 is in a second state, power from the first EDM control system 80 is delivered to the fifth machining head 76, power from the second EDM control system 81 is delivered to the fourth machining head 74, and power from the third EDM control system 82 is delivered to the sixth machining head 78.

The controllers of the EDM control systems 80–82 are connected to corresponding machining heads via servo cables (not shown) to control electrode positioning while a particular work station is operating. Specifically, the first EDM control system 80 is connected to the second and fifth machining heads 70, 76, the second EDM control system 81 is connected to the first and fourth machining heads 68, 74, and the third EDM control system 82 is connected to the third and sixth machining heads 72, 78.

Each of the first and fourth machining heads 68, 74 has a linear servomotor 88 mounted on a column 90 located adjacent to the corresponding workpiece fixture 64. Each servomotor 88 comprises a linear motor stator 92, which is fixedly attached to the column 90, and a linear motor slider 94, which is slidingly mounted on the stator 92. An electrode holder 96 is mounted on the slider 94 and supports an electrode 98 below the workpiece 66. When the linear servomotor 88 is energized, the slider 94 is caused to move linearly with respect to the stator 92. In this case, the servomotor 88 is arranged vertically on the column 90 so that the slider 94 will move vertically, thereby moving the electrode 98 into or out of machining engagement with the workpiece 66. The displacement of the slider 94 is dictated by signals sent from the CNC in the EDM control system 80.

This embodiment differs from the embodiment of FIG. 1 in that it operates on two workpieces instead of six. However, three EDM control systems operate on one workpiece at the same time. Since all electrodes work on a workpiece in parallel, each workpiece is inserted into a fixture only once. This reduces part handling with respect to the FIG. 1 embodiment.

Figure 3:
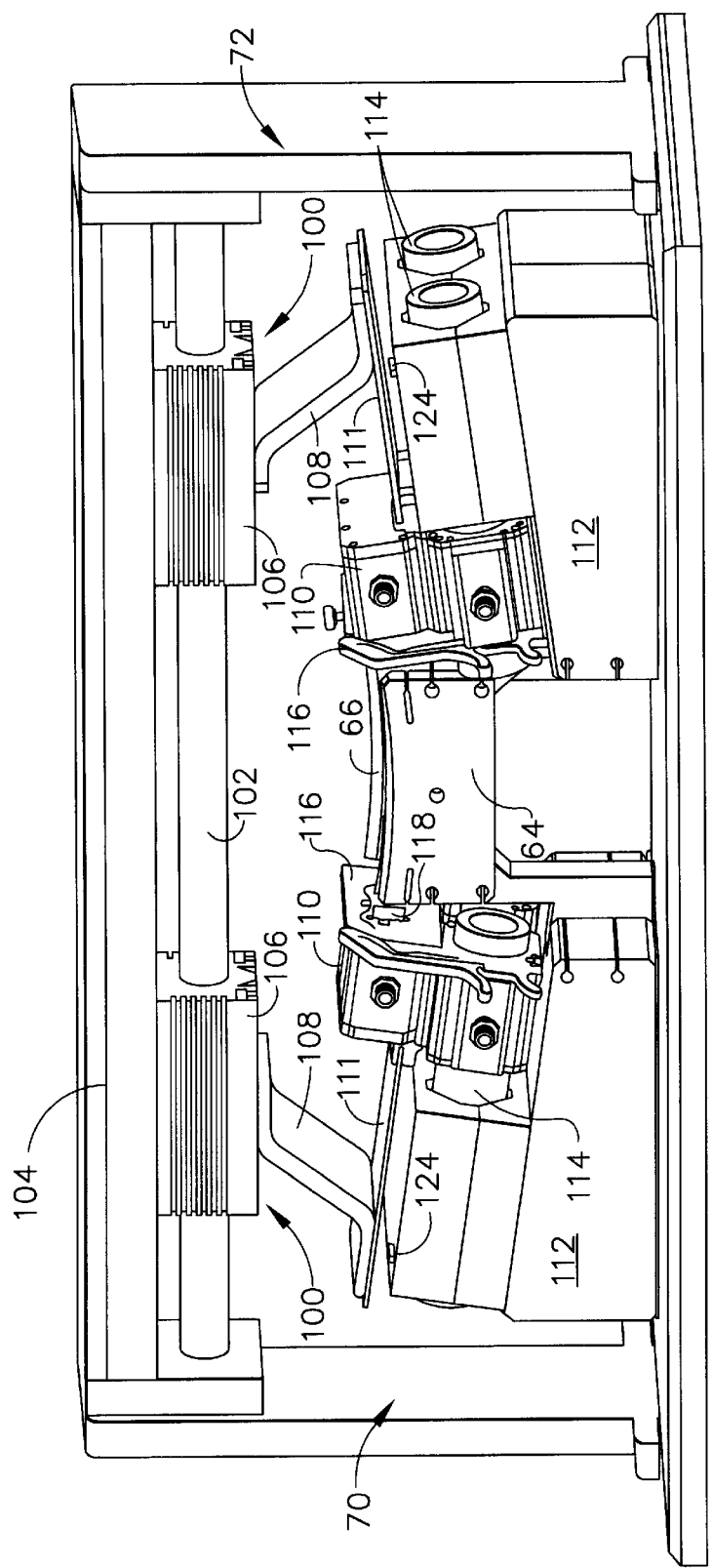
FIG. 3 is a more detailed view of a portion of the EDM apparatus of FIG. 2.

Referring to FIG. 3, the second and third machining heads 70, 72 are described in more detail. Specifically, the second machining head 70 includes a linear servomotor 100 disposed adjacent to a first end of the workpiece 66. The servomotor 100 comprises a linear motor stator rod 102 mounted over the workpiece 66 by a frame 104. A linear motor slider 106 is slidingly mounted on the stator rod 102. A bracket 108 is attached to the underside of the slider 106, and a slide block 110 is connected to the bracket 108 via a flexible connector 111. The slide block 110 is slidingly supported above the base of the tank 58 by a stationary block 112 and a pair of support rods 114. An electrode holder 116 is mounted on the slide block 110 and supports an electrode 118.

When the servomotor 100 is energized, the slider 106 is caused to move linearly with respect to the stator rod 102. The movement of the slider 106 causes the slide block 110 to slide along the support rods 114, so that the electrode 118 moves into or out of machining engagement with the first end of the workpiece 66. In the case of a curved workpiece, such as the shroud 66, the support rods 114 are arranged at an angle with respect to the base of the tank 58 to accommodate the workpiece curvature. The slider 106 moves horizontally, whereas the slide block 110 moves at an incline. The divergence between the two lines of motion is accommodated by the flexible connector 111. The flexible connector 111 can also provide electrical isolation between the servo power of the servomotor 100 and the power supplies of the EDM control systems 80–82. The displacement of the slider 106 is dictated by signals sent from the CNC of the EDM control system 82. The third machining head 72 is essentially the same as the second machining head 70, except that it is disposed adjacent the opposite end of the workpiece 66. The sliders of both the second and third machining heads share the same stator rod 102, which spans the width of the first work station 54.

The fifth and sixth machining heads 76, 78 of the second work station 56 are substantially similar to the second and third machining heads 70, 72. Thus, each work station 54, 56 has three electrodes. Since each electrode shares a power supply with one other one of the electrodes, there are twice as many electrodes as power supplies. It is noted that the fifth and sixth machining heads 76, 78 would each include a slider, which share a common stator rod spanning the width of the second work station 56. However, it is also possible to provide a single stator rod spanning both work stations so that the sliders of the second, third, fifth and sixth machining heads 70, 72, 76, 78 could all utilize one stator rod.

The power transfer switch 86 is similar to that described above in connection with the first embodiment. The power transfer switch 86 includes an acknowledge button 120 connected to the switch control circuitry such that the power transfer switch 86 will not be able to switch between its first and second states unless the acknowledge button 120 has been pressed. The acknowledge button 120 resets whenever the power transfer switch 86 switches between its first and second states. A stop button 122 is provided for emergency cut-off of power to both work stations 54, 56.

A linear measuring scale (not shown) is mounted adjacent to the servomotor in each machining head. Each linear measuring scale precisely measures the position and velocity of the corresponding slider and provides feedback of these measurements to the servocontrols in the EDM control systems 80–82. Each machining head further includes a retract sensor 124 for detecting when its slider, and hence its electrode, are in a retracted position away from the workpiece 66. As before, the retract sensors 124 can be any conventional device such as a mechanical limit switch or a proximity sensor and are disposed on the machining head so as to be triggered when the electrode is retracted. When triggered, the retract sensors 124 output a signal to the power transfer switch 86.

In operation, the first work station 54 alternates with the second work station 56. While one work station is operating, the other group is inactive and available for workpiece loading. For example, during operation of the first work station 54, the servomotor 88 of the first machining head 68 moves the slider 94 upward under control of the first EDM control system 80. This causes the electrode 98 to advance upward toward the workpiece 66. The electrode 98 is energized by the power supply in the first EDM control system 80 for providing electrical energy to produce electrical discharges or sparks between the electrode 98 and the workpiece 66. As the sparks vaporize the workpiece material, the servomotor 88 continues to advance the electrode 98 until the desired feature (the anti-rotation notch in the illustrated example) is finished. At this point, the servomotor 88 retracts the electrode 98, causing the retract sensor 124 to be tripped.

In each of the second and third machining heads 70, 72, the servomotor 100 the slider 106 and the electrode 118 toward the workpiece under the control of the respective EDM control system 81, 82. The electrodes 118 are energized by the power supplies in the EDM control systems 81, 82 for providing electrical energy to produce electrical discharges or sparks between the electrodes 118 and the workpiece 66. As the sparks vaporize the workpiece material, the servomotor 100 continues to advance the electrodes 118 until the desired features (the two seal slots in the illustrated example) are finished. At this point, the servomotors 100 retract the electrodes 118, causing the retract sensors 124 to be tripped.

While the first work station 54 is operating, an operator loads a new workpiece 66 into the workpiece fixture 64 of the inactive second work station 56. Because the dielectric fluid level is maintained just high enough to immerse an installed workpiece, workpiece loading can be accomplished without draining the dielectric fluid by providing the operator with protective gloves. The operator presses the acknowledge button 120 when the new workpiece 66 is properly loaded. When all three of the retract sensors 124 from the first work station 54 have been tripped, the power transfer switch 86 switches states (provided that the acknowledge button 120 has been pressed since the last switch over). This removes all power from the first work station 54 and activates the second work station 56 so that the newly loaded workpiece 66 is machined. This alternating work cycle repeats continuously.

The foregoing has described an EDM apparatus that more efficiently machines workpieces, particularly aircraft engine parts, having multiple features. While specific embodiments of the present invention have been described, it will be apparent to those skilled in the art that various modifications thereto can be made without departing from the spirit and scope of the invention as defined in the appended claims.

What is claimed is:

1. An electrical discharge machining apparatus comprising:

at least two work stations, each work station having means for holding a workpiece, at least one electrode, and means for causing relative movement of said means for holding a workpiece and said electrode;

at least one power supply; and a power transfer switch having a first state wherein said power supply is connected to an electrode in a first one of said work stations and a second state wherein said power supply is connected to an electrode in a second one of said work stations.

2. The electrical discharge machining apparatus of claim 1 further comprising means for causing said power transfer switch to switch states.

3. The electrical discharge machining apparatus of claim 1 wherein said power transfer switch includes means for preventing switching between states.

4. The electrical discharge machining apparatus of claim 3 further comprising means for overriding said means for preventing switching between states.

5. The electrical discharge machining apparatus of claim 1 wherein each work station comprises:
   a base, one of said electrodes being mounted to said base;
   a workpiece fixture slidingly mounted to said base above said one electrode; and
   a servomotor mounted to said base and arranged to drive said workpiece fixture.

6. The electrical discharge machining apparatus of claim 5 wherein said servomotor is a linear servomotor having a stator fixedly attached to said base and a slider slidingly mounted on said stator, and wherein said workpiece fixture is affixed to said slider.

7. The electrical discharge machining apparatus of claim 6 wherein said linear servomotor is arranged vertically so that said workpiece fixture will be moved vertically, toward and away from said one electrode.

8. The electrical discharge machining apparatus of claim 6 further comprising a retract sensor for detecting when said slider is in a retracted position.

9. The electrical discharge machining apparatus of claim 1 wherein each work station comprises:
   a single workpiece fixture; and
   a plurality of machining heads arranged around said workpiece fixture, each machining head including one of said electrodes.

10. The electrical discharge machining apparatus of claim 9 wherein each machining head comprises a linear servomotor having a stator, a slider slidingly mounted on said stator and one of said electrodes attached to said slider.

11. The electrical discharge machining apparatus of claim 10 wherein said servomotor is mounted to a column located adjacent to said workpiece fixture.

12. The electrical discharge machining apparatus of claim 10 wherein said stator is a rod disposed over said workpiece fixture and at least two of said sliders are mounted on said rod.

13. The electrical discharge machining apparatus of claim 10 wherein each machining head includes a retract sensor for detecting when said slider is in a retracted position.

14. An electrical discharge machining apparatus comprising:
   a tank;
   a plurality of work stations disposed in said tank, each work station having means for holding a workpiece, at least one electrode, and means for causing relative movement of said means for holding a workpiece and said electrode;
   a plurality of power supplies; and
   a power transfer switch having a first state wherein each one of said power supplies is connected to a corresponding first electrode in one of said work stations and a second state wherein each one of said power supplies is connected to a corresponding second electrode in another one of said work stations.

15. The electrical discharge machining apparatus of claim 14 further comprising means for causing said power transfer switch to switch states.

16. The electrical discharge machining apparatus of claim 14 wherein said power transfer switch includes means for preventing switching between states.

17. The electrical discharge machining apparatus of claim 16 further comprising means for overriding said means for preventing switching between states.

18. The electrical discharge machining apparatus of claim 14 wherein each work station comprises:
   a base, one of said electrodes being mounted to said base;
   a workpiece fixture slidingly mounted to said base above said one electrode; and
   a servomotor mounted to said base and arranged to drive said workpiece fixture.

19. The electrical discharge machining apparatus of claim 18 wherein said servomotor is a linear servomotor having a stator fixedly attached to said base and a slider slidingly mounted on said stator, and wherein said workpiece fixture is affixed to said slider.

20. The electrical discharge machining apparatus of claim 19 wherein said linear servomotor is arranged vertically so that said workpiece fixture will be moved vertically, toward and away from said one electrode.

21. The electrical discharge machining apparatus of claim 19 further comprising a retract sensor for detecting when said slider is in a retracted position.

22. The electrical discharge machining apparatus of claim 14 wherein each work station comprises:
   a single workpiece fixture; and
   a plurality of machining heads arranged around said workpiece fixture, each machining head including one of said electrodes.

23. The electrical discharge machining apparatus of claim 22 wherein each machining head comprises a linear servomotor having a stator, a slider slidingly mounted on said stator and one of said electrodes attached to said slider.

24. The electrical discharge machining apparatus of claim 23 wherein said servomotor is mounted to a column located adjacent to said workpiece fixture.

25. The electrical discharge machining apparatus of claim 23 wherein said stator is a rod disposed over said workpiece fixture and at least two of said sliders are mounted on said rod.

26. The electrical discharge machining apparatus of claim 23 wherein each machining head includes a retract sensor for detecting when said slider is in a retracted position.

27. The electrical discharge machining apparatus of claim 14 wherein there are twice as many electrodes as power supplies.

28. A method of electrical discharge machining a plurality of workpieces, said method comprising:
   providing at least two electrical discharge machining work stations, each work station having at least one electrode;
   providing at least one power supply;

providing a power transfer switch having a first state wherein said power supply is connected to an electrode in a first one of said work stations and a second state wherein said power supply is connected to an electrode in a second one of said work stations; and switching states in said power transfer switch whenever one of said work stations competes its machining operation.

* * * * *